United States Patent
Inakazu et al.

(10) Patent No.: US 8,958,947 B2
(45) Date of Patent: Feb. 17, 2015

(54) VEHICLE APPROACH NOTIFICATION DEVICE

(75) Inventors: Shigeru Inakazu, Hyogo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 70 days.

(21) Appl. No.: 13/521,986

(22) PCT Filed: Feb. 25, 2010

(86) PCT No.: PCT/JP2010/001273
§ 371 (c)(1),
(2), (4) Date: Jul. 12, 2012

(87) PCT Pub. No.: WO2011/104755
PCT Pub. Date: Sep. 1, 2011

(65) Prior Publication Data
US 2012/0323439 A1    Dec. 20, 2012

(51) Int. Cl.
*G06F 7/00* (2006.01)
*B60Q 1/00* (2006.01)
*B60Q 5/00* (2006.01)
*G01C 21/36* (2006.01)
*G08G 1/00* (2006.01)

(52) U.S. Cl.
CPC ............ *G01C 21/3697* (2013.01); *B60Q 5/008* (2013.01); *G08G 1/207* (2013.01)
USPC ............. 701/36; 340/435; 340/436; 340/437; 340/441; 340/903

(58) Field of Classification Search
CPC .......... B60Q 5/008; B60Q 9/00; B60Q 1/506; B60Q 1/525
USPC ............ 701/36; 340/435, 436, 437, 441, 442, 340/903
See application file for complete search history.

(56) References Cited

U.S. PATENT DOCUMENTS 5,450,057 A * 9/1995 Watanabe ...................... 340/435
6,314,347 B1 11/2001 Kuroda et al.
6,356,185 B1 * 3/2002 Plugge et al. .............. 340/384.3
(Continued)

FOREIGN PATENT DOCUMENTS

DE    10 2004 028 772 A1    1/2006
DE    10 2005 035 040 A1    4/2006
(Continued)

*Primary Examiner* — Fadey Jabr
*Assistant Examiner* — Thomas Ingram
(74) *Attorney, Agent, or Firm* — Birch, Stewart, Kolasch & Birch, LLP

(57) ABSTRACT

A vehicle approach notification device 2 includes: position detection unit 21 that detects current positions of a vehicle; map database 22 storing map data; specific area travel determination unit 23 that determines the travel in a specific area by using the current position from the unit 21 and the map data from the database 22; specific area scale determination unit 24 that, when information from the unit 23 indicates a specific area, determines a scale of the specific area; storage unit 25 that stores a list of thresholds relating to the scale of the specific area; and notification control unit 28 that compares information of the scale from the unit 24 with the list of thresholds from the unit 25, and that when the threshold is satisfied, outputs a control signal for emitting a notification sound of the vehicle to notification sound control unit 30 that controls the sound.

6 Claims, 8 Drawing Sheets

(56) References Cited

U.S. PATENT DOCUMENTS

| | | | |
|---|---|---|---|
| 7,253,746 B2* | 8/2007 | Maekawa et al. | 340/903 |
| 8,138,897 B2* | 3/2012 | Leyerle | 340/425.5 |
| 8,179,234 B1* | 5/2012 | Atwood | 340/384.3 |
| 8,542,846 B2* | 9/2013 | Matejczyk et al. | 381/86 |
| 2002/0175825 A1* | 11/2002 | Clerk et al. | 340/686.6 |
| 2005/0200462 A1 | 9/2005 | Maekawa et al. | |
| 2005/0232432 A1 | 10/2005 | Yasushi et al. | |
| 2007/0257783 A1* | 11/2007 | Matsumoto et al. | 340/425.5 |
| 2012/0025964 A1* | 2/2012 | Beggs et al. | 340/435 |

FOREIGN PATENT DOCUMENTS

| | | | |
|---|---|---|---|
| JP | 2-49740 U | | 4/1990 |
| JP | 6-187595 A | | 7/1994 |
| JP | 10-250474 A | | 9/1998 |
| JP | 2000-1142 A | | 1/2000 |
| JP | 2000-333305 A | | 11/2000 |
| JP | 2004-306954 A | | 11/2004 |
| JP | 2005-255091 A | | 9/2005 |
| JP | 2006-21667 A | | 1/2006 |
| JP | 2006021667 A | * | 1/2006 |
| JP | 2008-273251 A | | 11/2008 |

* cited by examiner

FIG.5

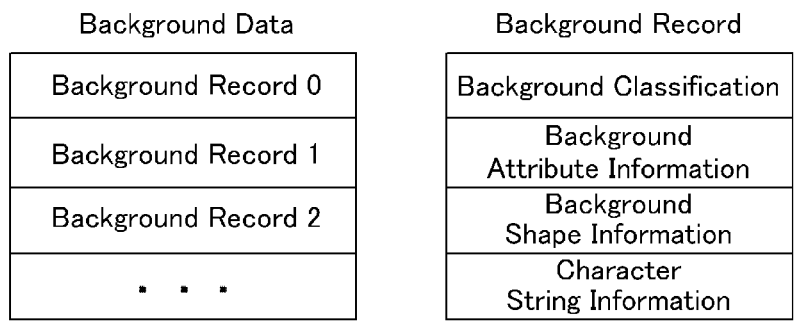

FIG.6

| Specific Area | Permitted / Not Permitted | Threshold |
|---|---|---|
| Parking Lot | Permitted | 10m or More |
| Blind Curve | Permitted | 10m or More |
| School Zone | Permitted | 10m or More |
| Narrow Street | Permitted | 10m or More |
| Residential Area | Permitted | 20m or More |
| Distance from Registered Spot | Permitted | Within 10m |
| Distance from Intersection | Permitted | Within 20m |
| Distance from Pedestrian Crossing | Permitted | Within 20m |
| Distance from Accident Black Spot | Permitted | Within 30m |

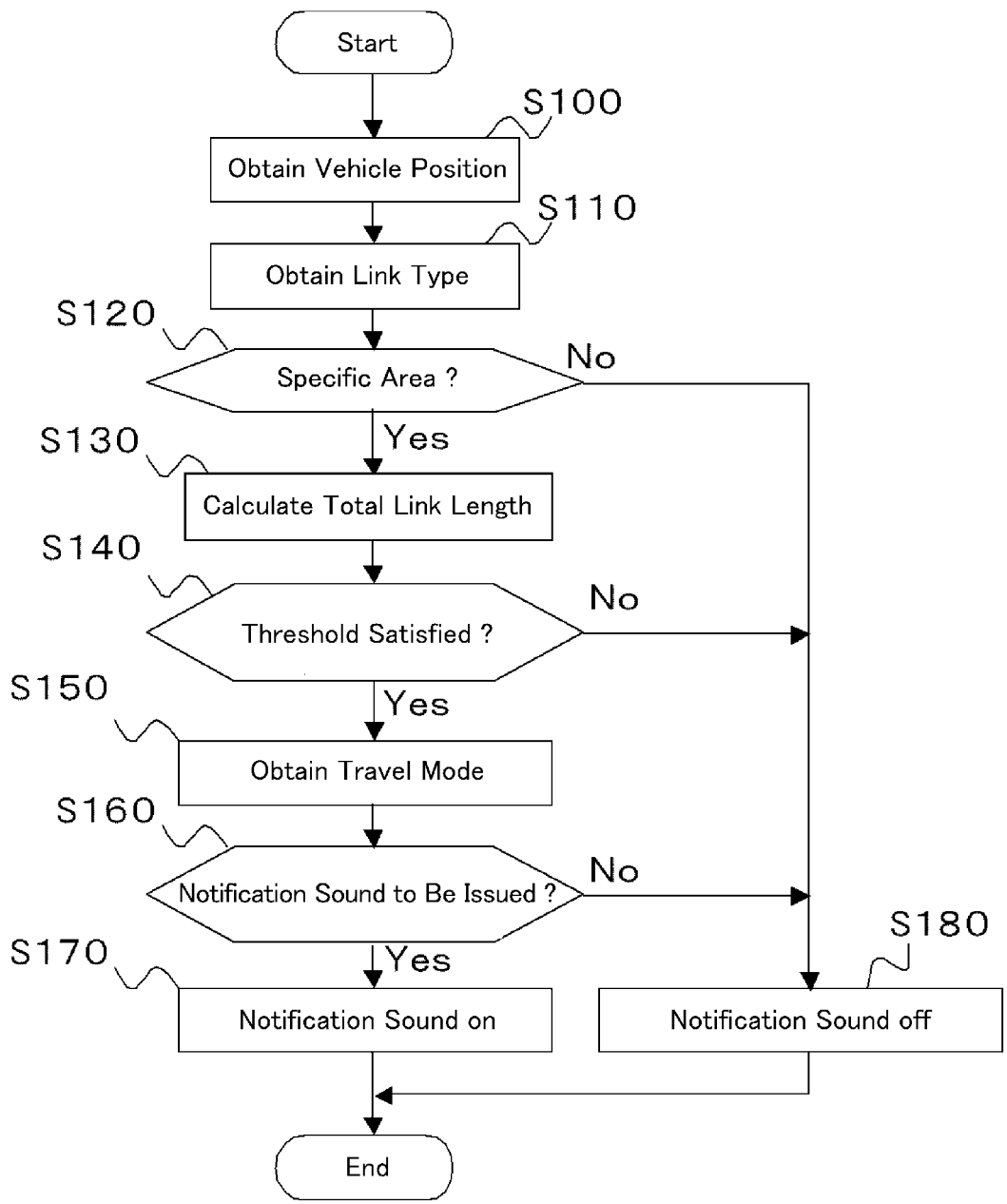

FIG.8

| Specific Area | Permitted/ Not Permitted | Threshold | | |
|---|---|---|---|---|
| | | Level 1 | Level 2 | Level 3 |
| Parking Lot | Permitted | 10~20m | 20~30m | 30m or More |
| Blind Curve | Permitted | 10~20m | 20~30m | 30m or More |
| School Zone | Permitted | 10~20m | 20~50m | 50m or More |
| Narrow Street | Permitted | 10~20m | 20~50m | 50m or More |
| Residential Area | Permitted | 20~50m | 50~100m | 100m or More |
| Distance from Registered Spot | Permitted | 10~5m | Within 5m | |
| Distance from Intersection | Permitted | 20~10m | 10~5m | Within 5m |
| Distance from Pedestrian Crossing | Permitted | 20~10m | 10~5m | Within 5m |
| Distance from Accident Black Spot | Permitted | 30~20m | 20~10m | Within 10m |

FIG.10

|  | Motor Travel Mode | | Engine Travel Mode |
|---|---|---|---|
|  | Lights off | Lights on |  |
| Stationary | Notification off | Notification off | Notification off |
| Normal Travel In Area Other than Specific Area | Notification off | Notification off | Notification off |
| Normal Specific Area — Parking Lot | Notification on | Notification off | Notification off |
| Normal Specific Area — Vicinity of Registered Spot | Notification on | Notification off | Notification off |
| Normal Specific Area — Narrow Street | Notification on | Notification off | Notification off |
| Normal Specific Area — Residential Area | Notification on | Notification off | Notification off |
| Dangerous Specific Area — Blind Curve | Notification on | Notification on | Notification off |
| Dangerous Specific Area — School Zone | Notification on | Notification on | Notification off |
| Dangerous Specific Area — Periphery of Intersection | Notification on | Notification on | Notification off |
| Dangerous Specific Area — Periphery of Pedestrian Crossing | Notification on | Notification on | Notification off |
| Dangerous Specific Area — Periphery of Accident Black Spot | Notification on | Notification on | Notification off |

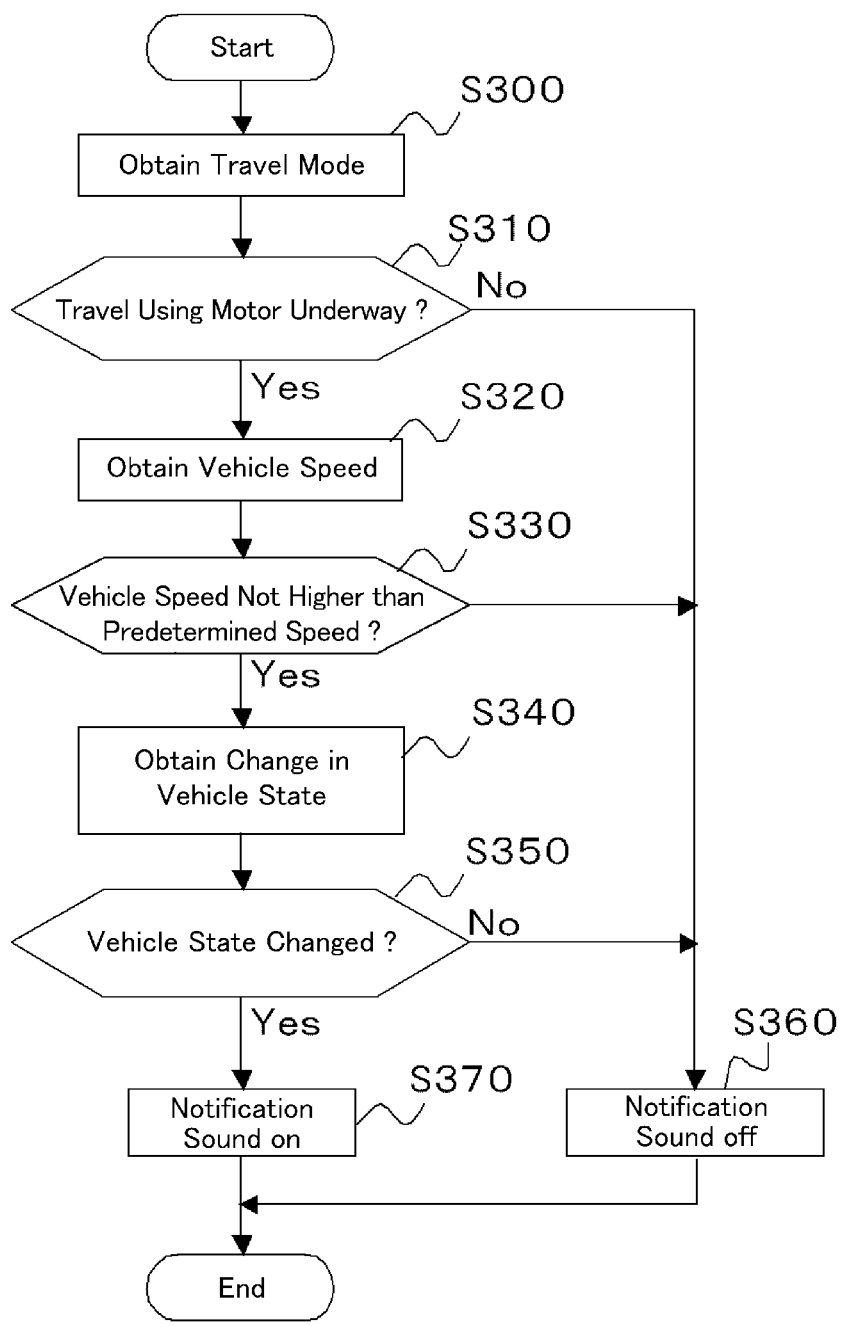

VEHICLE APPROACH NOTIFICATION DEVICE

TECHNICAL FIELD

The present invention relates to a vehicle approach notification device that issues a notification to a surrounding area of the approach of a vehicle using a notification sound and so on, and more particularly to a notification device employed in an electric automobile, a fuel cell vehicle, a hybrid vehicle, or the like that uses a motor as a drive source.

BACKGROUND ART

A pedestrian walking through a town and so on or a person riding a bicycle or the like can recognize the approach of a vehicle from an engine sound of the vehicle. When an electric automobile, a fuel cell vehicle, a hybrid vehicle, or the like travels using a motor, however, no engine sound is generated, and thereby the noise generated by the vehicle is decreased. Therefore, it becomes difficult for a pedestrian or the like to recognize the approach of the vehicle, which can give a cause such that accidental contacts with the pedestrian and so on happen. For this reason, in a conventional vehicle existence notification device and vehicle existence notification method, a pedestrian is notified of the existence of the vehicle by selecting notification using the light generated by headlights, the sound generated by a speaker, or a combination of the light and sound corresponding to travel surroundings such as travel area, travel time zone, intensity of illumination, and volume outside the vehicle (see Patent Document 1, for example).

PRIOR ART DOCUMENTS

Patent Documents

Patent Document 1: Japanese Patent Application Publication No. 2005-255091 (JP-A-2005-255091) (Page 10, FIG. 1)

SUMMARY OF THE INVENTION

Problems to be Solved by the Invention

In the conventional vehicle existence notification device and vehicle existence notification method, the pedestrian is notified corresponding to the travel surroundings; however, since the scale of the travel area is not taken into account, the same notification is issued even in the case passing a corner of a small residential area, as well as the case passing a central portion of a large-scale residential area. Further, though the notification is issued on the basis of the time zone and the lightness of the surroundings, upon lighting of the light, pedestrians and so on can recognize the approach of the vehicle owing to the light; thus, the notification is issued even in the low necessity of the notification. Moreover, though the notification is issued during a low-speed travel and a brake operation, a change of the state of the vehicle in the cases having a high degree of danger to people such as start of the vehicle, and left or right turn thereof is not taken into consideration; thus, an appropriate notification thereto has been not issued. As mentioned above, there is a problem such that an appropriate notification is not issued.

The present invention is made to solve the aforementioned problem, and an object of the invention is to provide a vehicle approach notification device that issues an appropriate notification to people such as pedestrians by taking into account a scale of a specific area and so on.

Means for Solving the Problems

A vehicle approach notification device of the invention includes: a position detection unit that detects a current position of a vehicle; a map database storing map data; a specific area travel determination unit that determines a travel thereof in a specific area by using the current position from the position detection unit and the map data from the map database; a specific area scale determination unit that, when information from the specific area determination unit indicates a specific area, calculates a scale of the specific area by using the map data; a storage unit that stores a list of thresholds relating to the scale of the specific area; and a notification control unit that compares information of the scale from the specific area scale determination unit with the list of thresholds from the storage unit, and that when a corresponding threshold is satisfied, outputs a control signal for emitting a notification sound of the vehicle to a notification sound control unit that controls the notification sound.

Effects of the Invention

According to the invention, since the scale of the specific area is assessed, and the approach of the vehicle is notified on the basis of the list of thresholds, a vehicle approach notification device that issues an appropriate notification to pedestrians and so on can be obtained.

BRIEF DESCRIPTION OF THE DRAWINGS

FIG. 5 is an example of background data in accordance with the first embodiment in the invention.

FIG. 6 is a list of thresholds of specific areas in accordance with the first embodiment in the invention.

FIG. 7 is a flowchart showing an operation of the vehicle approach notification device in accordance with the first and second embodiments in the invention.

FIG. 8 is a list showing levels of thresholds of specific areas in accordance with the second embodiment in the invention.

FIG. 10 is a list showing ON/OFF of a notification sound in accordance with the third embodiment in the invention.

FIG. 11 is a flowchart showing an operation of a vehicle approach notification device in accordance with a fourth embodiment in the invention.

BEST MODE FOR CARRYING OUT THE INVENTION

First Embodiment

Figure 1:
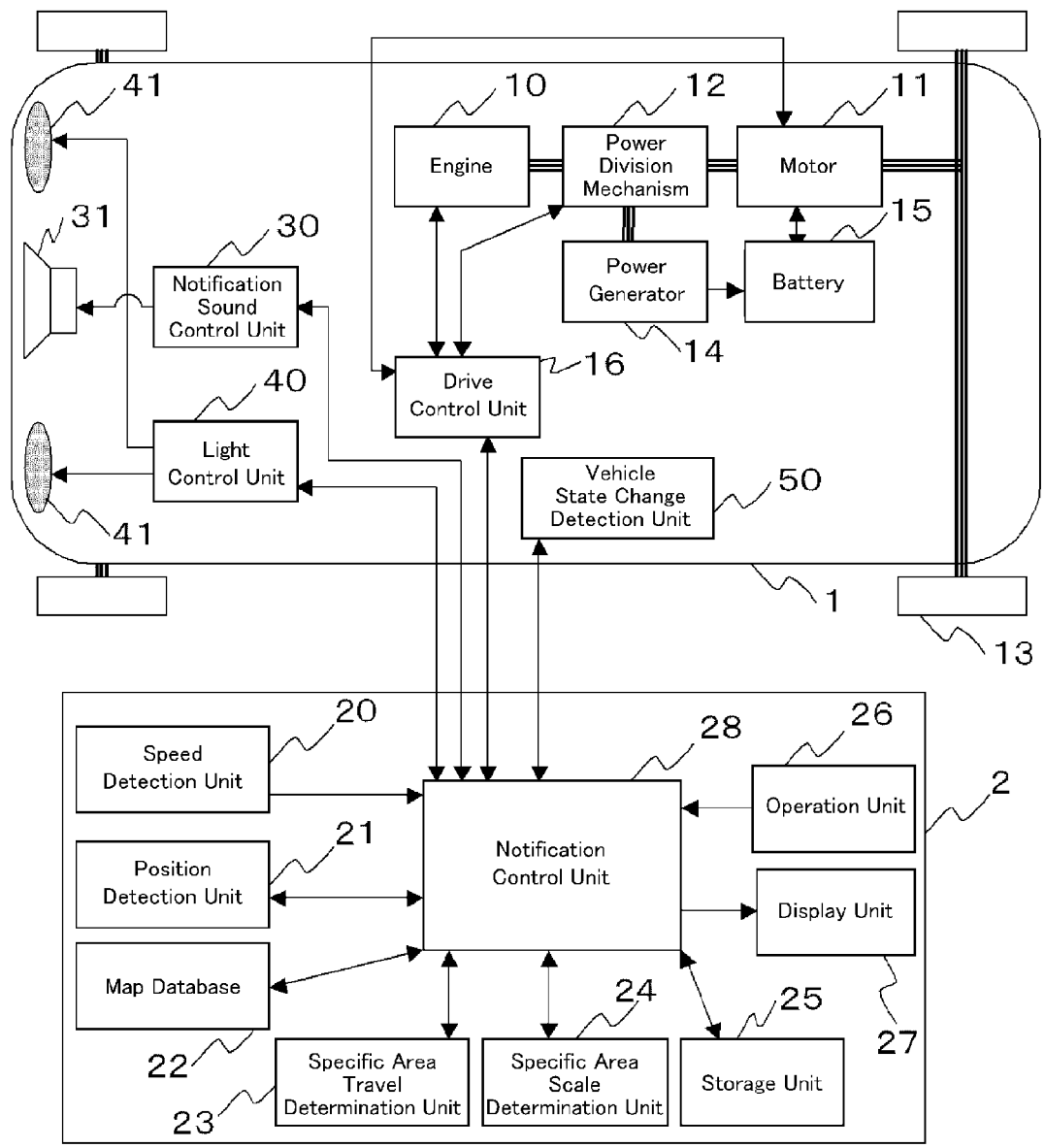
FIG. 1 is a block diagram showing a vehicle approach notification device in accordance with first to fourth embodiments in the present invention.

FIG. 1 is a block diagram showing a hybrid vehicle 1 and a vehicle approach notification device 2 in accordance with a first embodiment of the present invention. An internal combustion engine 10 to be driven by a fuel such as gasoline or light oil, and a motor 11 such as an alternating current motor to be rotated by electric power are provided within the body of the hybrid vehicle 1 and used together as power sources for vehicles. Further, a brake device such as a drum brake or a disc brake (not shown) is provided therewith. Incidentally, these components may be disposed in a vehicle such as passenger vehicle, bus, or truck.

As an interlocking system of the engine 10 and the motor 11 for the hybrid vehicle, several drive systems may be employed such as a series system in which the engine is used for power generation only, a parallel system in which the plurality of power sources that are installed thereto are used to drive wheels thereof, and a split system in which power is distributed by a power division mechanism. FIG. 1 is a schematic diagram showing a split system in which power from the engine is divided by a power division mechanism 12 such as planetary gear or clutch and distributed to the motor 11 (in order to drive drive wheels 13 via a motor shaft) and a power generator 14. It is noted that the motor may be directly connected to each of the drive wheels.

In an engine travel mode to be traveled by only the engine, for example, the hybrid vehicle 1 shown in FIG. 1 travels by driving the drive wheels 13 without supplying electric power to the motor 11 disposed on the same shaft. In this case, when surplus power exists in the engine, the power generator 14 may be rotated by the power division mechanism 12 to generate the electric power, and the generated power may be charged to a battery 15.

In a combined travel mode to be traveled by the motor and the engine used in combination, the drive wheels 13 are driven by the engine 10, and the drive wheels 13 are driven by also supplying power to the motor 11 from the battery 15. This mode is often used when a large amount of power is required, such that acceleration thereof is desired.

In a motor travel mode to be traveled by only the motor, the motor 11 drives the drive wheels 13 using the electric power supplied from the battery 15 to carry out the travel. In this case, the engine 10 may rotate the power generator 14 using the power division mechanism 12 in order to generate the power, and the generated power may be charged to the battery 15. However, when the engine 10 is stopped at this time, the noise of the engine is lost, which leads to reduction in the noise to be generated by the vehicle; thus, it becomes hard for pedestrians and so on to notice the vehicle. For this reason, when it is wished that people such as pedestrians and cyclists is notified of the existence of the vehicle, a warning sound or a sound effect is emitted in a manner described below. These travel modes are controlled on the basis of control signals from a drive control unit 16 that controls the drive state of the hybrid vehicle.

The battery 15 is a storage unit that stores the power generated by the charging control unit 14, and stores a regenerative current from the motor 11 to be generated during the braking. Further, the battery 15 is a secondary battery that can be charged and discharged repeatedly; the secondary battery is typically a lead storage battery, a nickel cadmium battery, a nickel hydrogen battery, or the like, but may also be a high performance lead storage battery, a lithium ion battery, a sodium sulfur battery, or the like for use in an electric automobile and so on.

The vehicle approach notification device 2 is constituted by a speed detection unit 20, a position detection unit 21, a map database 22, a specific area travel determination unit 23, a specific area scale determination unit 24, a storage unit 25, an operation unit 26, a display unit 27, and a notification control unit 28. Note that the notification control unit 28, the specific area travel determination unit 23, and the specific area scale determination unit 24 are constituted by a calculation unit such as CPU (Central Processing Unit), and a semiconductor memory to be operated by an application program.

The speed detection unit 20 receives a speed pulse or the like from the vehicle and determines a vehicle speed. The position detection unit 21 detects a vehicle position using a reception signal from a satellite positioning system such as GPS (Global Positioning System), the vehicle speed, bearing information from a gyro sensor, and map matching. The map database 22 is constituted by a magnetic disk such as an HDD (Hard Disk Drive), a DVD (Digital Versatile Disc), a large capacity memory, and the like to store map data. Specific areas are stored in the map data, and are to be alerted to people such as pedestrians and riders of cycles, including school zones and the surrounding areas of pedestrian crossings.

Figure 2:
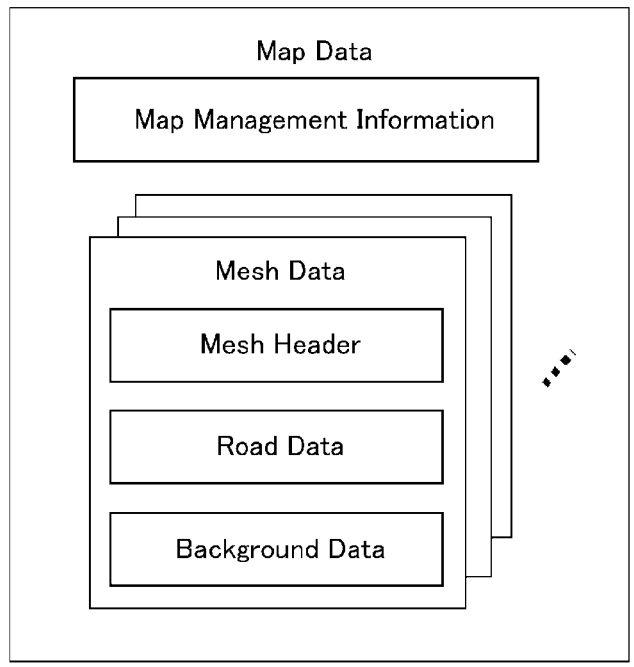
FIG. 2 is an example of a map data structure in accordance with the first embodiment in the invention.

FIG. 2 is an example of the map data stored in the map data storage unit 22. Map management information and at least one set of mesh data are included for the map data. The map data are layered in accordance with a degree of map detail such that a whole country is divided into several rectangular areas (meshes) on each layer and the mesh data are provided for each mesh on each layer. A mesh of an upper layer thereof is a collection of a plurality of meshes of a lower layer thereof, and the size of the mesh is increased as the upper layer becomes higher.

The map management information is data for managing the mesh data on each layer, and includes, for each layer, information associating each area with each mesh data, a storage position of the mesh data in the corresponding map information, and a data size.

Figure 3:
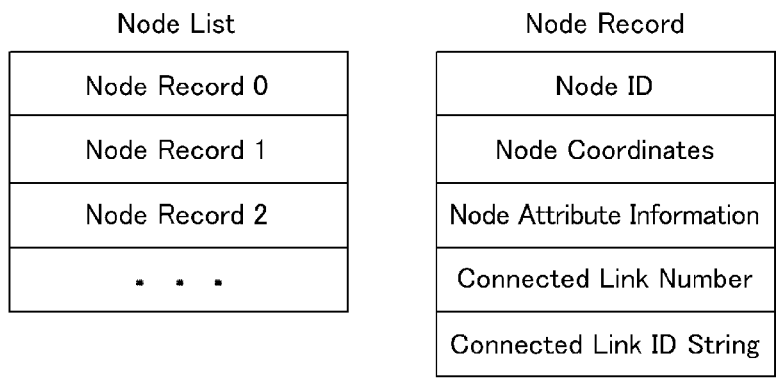
FIG. 3 is an example of a node list in accordance with the first embodiment in the invention.
Figure 4:
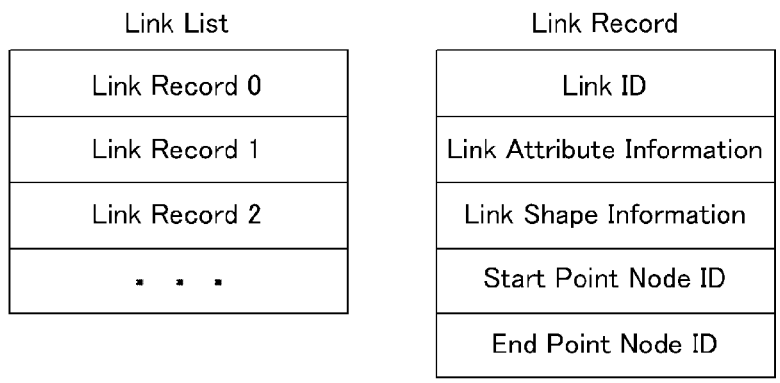
FIG. 4 is an example of a link list in accordance with the first embodiment in the invention.

The mesh data are constituted by: road data used for route searches, map matching, and/or road display; background data and the like for displaying map backgrounds such as rivers, seas, place names, landmarks and so on; and a mesh header for managing these data. As shown in FIGS. 3 and 4, the road data are constituted by a node list, a link list, and data for managing these lists. The background data are constituted by data shown in FIG. 5.

FIG. 3 is an example of the node list. The node list is a list of node records. Nodes represent spots such as intersections positioned on a road, and a node record is provided for each node. The node record is constituted by a node ID for identifying the node, node coordinates representing a geographical position of the node, node attribute information representing various attributes relating to the node such as presence of traffic lights and left/right turn restrictions, a connected link number indicating the number of links connected to the node, and a connected link ID string for identifying the links connected to the node.

FIG. 4 is an example of the link list. The link list is a list of link records. Links represent roads linking the nodes, and a link record is provided corresponding to each link. The link record is constituted by: a link ID for identifying the link; link attribute information representing a link length, a width, a type attribute, and so on of the link; link shape information that is a list of coordinates representing geographical positions of vertices where the shape of the link is expressed by a polygonal line; a start point node ID representing a node on a start point side of the link; and an end point node ID representing a node on an end point side of the link.

It is noted that the link attribute information includes: an attribute indicating that the link corresponds to a school zone; an attribute indicating a link existing within a parking lot; an attribute indicating that the link is a narrow street; an attribute indicating a link positioned in the surrounding area of a pedestrian crossing or an intersection; an attribute indicating a link positioned in a residential area, and so on.

FIG. 5 is an example of the background data. The background data correspond to a list of background records representing map backgrounds of surfaces, lines, and points. The background record is constituted by: a background classification indicating a classification; background attribute information indicating a background type and so on; background shape information indicating a list of coordinate values representing geographical positions of vertices where a shape classification (a point, a line, or a surface) of the background is expressed by a polygonal line or a polygon, or indicating the number of the coordinate values; and character string information representing a character string of a background name.

Based on the current position of the vehicle from the position detection unit 21 and the map data from the map database 22 via the notification control unit 28, the specific area travel determination unit 23 determines whether or not the vehicle is on travel in a specific area where the following are expected: there exist a large number of pedestrians, bicycles, and so on, and an accident happens more likely, which includes, for example, a school zone, a narrow street, a blind curve, a residential area, a parking lot, the surrounding area of a pedestrian crossing or an intersection, the surrounding area of a registered spot by a user such as home, the surrounding area of an accident black spot, and so on. More specifically, the aforementioned link attribute information in the road data is used. Alternatively, the aforementioned background attribute information in the background data may be used. School zones, narrow streets, the surrounding area of pedestrian crossings and intersections, and so on may be indicated in the background attribute information, and the vehicle is determined to be underway in a specific area when passing through these areas.

The specific area scale determination unit 24 determines the scale of the specific area travel determination unit 23. More specifically, a total length of the links belonging to a single specific area is determined as the scale of the specific area using the aforementioned link attribute information in the road data. Alternatively, the aforementioned background attribute information in the background data may be used. In this case, when an area is added to the background record, the area of a parking lot, a school zone, a narrow street, a blind curve, a residential area, and the like may be determined as the scale of the specific area. It is noted that in the case of the spots such as registered spot, intersection, pedestrian crossing, and accident black spot, a distance between the spots and the current position is determined, and this distance is determined as the scale.

The storage unit 25 is constituted by a non-volatile semiconductor memory, an HDD, and so on, and stores a list of thresholds of specific areas serving as a reference when the approach of the vehicle is notified as shown in FIG. 6 (described below).

The operation unit 26 is constituted by a touch panel formed on the display unit 27 composed of a liquid crystal display and so on, and/or a remote controller, and used to correct the list of the thresholds of the specific areas stored in the storage unit 25. The specific areas in which pedestrians and the like are to be notified of the approach of the vehicle, and the thresholds relating to the scale of the specific area are input into the operation unit 26. For example, an arbitrary spot such as home is set as a registered spot in the specific area, and/or thresholds such as a distance from the registered spot and a size of a parking lot are input thereinto. Further, the thresholds in the scale of the specific areas that are input in advance, for example, the length of the school zone, the length of the narrow street, the length of the blind curve, the distance from the intersection, the distance from the pedestrian crossing, and so on may be modified.

It is noted that the vehicle approach notification device 2 in the first embodiment may also include a route search unit that makes a search for a route to a destination to be used as a car navigation device. In this case, an origin and/or a destination may be input using the operation unit 26, and the display unit 27 may display an operating condition of the operation unit 26, and/or display a route and a map of the car navigation device.

The notification control unit 28 controls the whole vehicle approach notification device 2, obtains the current travel mode from the drive control unit 16, obtains the vehicle speed from the speed detection unit 20, and compares the list, for example, stored in the storage unit 25, of thresholds relating to the specific areas where a notification is issued to a pedestrian and the like, as shown in FIG. 6, with the scale of the specific area from the specific area scale determination unit 24. From the above information, a control signal for emitting a notification sound is output to a notification sound control unit 30.

The notification sound control unit 30 emits the notification sound from a speaker 31 or the like on the basis of the control signal from the notification control unit 28. Further, a light control unit 40 controls the lighting of headlights (lights) and outputs the lighting state of the headlights to the notification control unit.

A vehicle state change detection unit 50 detects changes in a vehicle state such as start thereof, right or left turn, illumination-start of the light, and operation-start of a windshield wiper. These are constituted by ECUs for controlling in-vehicle units, and an in-vehicle LAN (Local Area Network) or CAN (Controller Area Network), and so on. More specifically, a left or right turn is detected on the basis of information from an ECU for controlling blinkers; start and stop thereof, the speed of the vehicle and a change in the speed thereof, and so on are detected on the basis of a vehicle speed pulse from an EUC of a speedometer; acceleration thereof is detected on the basis of a signal from an accelerator; and the illumination-start of the lights and the working-start of the windshield wiper are detected on the basis of a signal obtained from light and windshield wiper control devices. Note that the right or left turn, the acceleration, the illumination of the lights and so on may be detected using a variety of sensors such as a gyro sensor, an acceleration sensor, a vehicle speed sensor, and a lightness sensor for the vehicle state change detection unit 50.

An operation of the vehicle approach notification device 2 thus configured will be described below in accordance with a flowchart shown in FIG. 7. First, the notification control unit 28 detects the current position of the vehicle by means of the position detection unit 21 (Step S100). Next, the map database 22 is accessed and the link type is obtained by looking up the link record of the link in which the vehicle is on travel based on the link list shown in FIG. 4 and the vehicle position (Step S110). When in Step S120 the link type is the one indicating a specific area and "permitted" on the basis of the list shown in FIG. 6, the operation proceeds to Step S130. When the link type is not the one indicating a specific area or "not permitted," the operation proceeds to S180, where the notification sound is not emitted.

In Step S130, the map database 22 is accessed, links having identical link attributes are pursued from the link list shown in FIG. 4, and the link lengths thereof are accumulated to calculate a total link length thereof. Thereafter, in Step S140, the threshold of the corresponding link type is obtained from the list in FIG. 6 and compared with the total link length of the specific area or a distance from a specific spot. When the threshold is satisfied, the operation proceeds to Step S150, and when the threshold is not satisfied, the operation proceeds to S180, not emitting the notification sound.

For example, FIG. 6 illustrates that when the size of a parking lot is 10 m or more, the length of a blind curve, the length of a school zone, or the length of a narrow street is 10 m or more, or the length of a residential area is 20 m or more, the threshold for issuing a notification is satisfied and then the notification is permitted. Also, it illustrates that when the distance from a registered spot is no more than (within) 10 m, the distance from an intersection or the distance from a pedestrian crossing is no more than 20 m, and the distance from an accident black spot is no more than 30 m, the threshold for issuing a notification is satisfied and then the notification is permitted.

The notification control unit 28 obtains the vehicle travel mode from the drive control unit 16 in Step S150, and determines whether the notification sound is output or not in Step S160. In the cases of the travel using the motor, in other words, the motor travel mode of the motor alone, and the combined mode by the motor and the engine used in combination, the motor is used for the drive, and therefore engine sound thereof becomes smaller as compared with that in the engine travel mode of the engine alone. Thus, when the motor is used, the operation proceeds to Step S170 in order to emit the notification sound. On the other hand, in the engine travel mode of the engine alone, the operation proceeds to Step S180. In this case, pedestrians and so on can recognize the vehicle owing to the engine sound, similarly to a typical automobile having an internal combustion engine, and therefore the notification sound is not output. Thereafter, the operation is terminated.

In Step S170, the notification control unit 28 outputs the control signal for emitting the notification sound to the notification sound control unit 30. The notification sound control unit 30 receives the control signal and then emits the notification sound from the speaker. Thereafter, the operation is terminated.

Incidentally, though the instance of the hybrid vehicle is described in the above, a vehicle to be traveled by electricity without an internal combustion engine such as an electric automobile, a fuel cell vehicle, and a solar cell vehicle holds true similarly. In these instances, the travel mode is always determined the motor travel mode in Step S150, and therefore the operation proceeds to Steps S160 and S170.

The list of thresholds of specific areas in FIG. 6 is preferably set to be changable by inputs of a user through the operation unit 26. For example, a notification is set to be issued when the length of a blind curve is 10 m or more; however, this threshold may be changed to 20 m, for example. Further, the notification is set to "permitted" in relation to a parking lot having a size of 10 m or more; however, when this is changed to "not permitted," the notification in the parking lot may be set to unavailable. Furthermore, specific areas may be appropriately added thereto.

Incidentally, when all of the specific areas are set to "not permitted," a normally OFF mode not emitting normally the notification sound is set. In this instance, however, the quietness of motor travel may be misused at night and so on, and therefore measures may be taken to ensure that the areas such as narrow streets where the quietness may be misused are always set at "permitted" and further cannot be changed to "not permitted."

According to the vehicle approach notification device thus configured, the scale of the specific area is determined, and the notification of the approach of the vehicle is issued on the basis of the threshold list. Therefore, the notification is not issued in a location where the corresponding threshold is not satisfied, for example, an end of a small-scale residential area, so that disturbances to the neighborhood can be suppressed, while in a location where there exist a large number of pedestrians, cyclists, and so on, for example, a large-scale residential area, the notification is issued, and thus the pedestrians and so on can be notified appropriately; as a result, a vehicle approach notification device exhibiting improved safety can be obtained. Further, since the user can change the setting of the specific area and the thresholds, user-friendliness is enhanced. Moreover, when it is established that the normally OFF mode cannot be set, misuse of the quietness of the motor travel at night and so on can be reduced.

Second Embodiment

In the vehicle approach notification device in accordance with the first embodiment, there is provided the alternative of issuing the notification or not issuing the notification depending upon whether the threshold is satisfied or not; however, in a second embodiment, a vehicle approach notification device will be described such that the volume of the notification sound and so on are changed in response to the level of the threshold in consideration of the scale of the specific area and the degree of danger thereof.

A block diagram and a flowchart illustrating the vehicle approach notification device 2 and the hybrid vehicle 1 are respectively identical to FIGS. 1 and 7 of the first embodiment except that in Step S140, the total link length obtained in Step S130 is compared with levels of thresholds of specific areas as shown in FIG. 8. For example, a parking lot having a size of 10 m or more and less than 20 m is set at level 1, a size of 20 m or more and less than 30 m is set at level 2, and a large parking lot having a size of 30 m or more is set at level 3. Similarly, a residential area having a length of 20 m or more and less than 50 m is set at level 1, a length of 50 m or more and less than 100 m is set at level 2, and a large-scale residential area having a length of 100 m or more is set at level 3 to be assumed a high degree of danger. Similarly, when the distance from a registered spot is beyond 5 m and within 10 m, level 1 is set, and when the distance is within 5 m, level 2 is set; level 3 may, in certain cases, be omitted. Likewise, when the distance from an accident black spot is beyond 20 m and within 30 m, level 1 is set, when the distance is beyond 10 m and within 20 m, level 2 is set, and when the distance is within 10 m, level 3 is set. As mentioned above, when the degree of danger is high, such that the scale of the specific area is large and that the distance to a dangerous spot is short, the level of the degree of danger is increased.

After the travel mode is obtained in Step S150, when the determined level of the threshold satisfies a notification condition, that is, corresponding to a travel using the motor, the notification sound is output in response to the level of the threshold in Step S170. Since the high level of the threshold indicates a high degree of danger to pedestrians, the volume of the sound is increased, the musical interval thereof is enhanced, the interval of repeated sounds is shortened, and/or the quality of the sound is changed.

However, the level may be changed corresponding to the time, season, and day of the week. For example, the level may be raised by one in the event that it is difficult to recognize the vehicle in a dim light at twilight and the like, and the level may be also raised by one on the way from/to school. The level may also be raised by one during winter when road surfaces can freeze. Furthermore, in the event that several conditions overlap, the level may be raised by two, for example, corresponding to a dim light during winter when road surfaces freeze and so on. Conversely, the level may be lowered by one in a school zone on a holiday.

Further, the list of the thresholds of the specific areas shown in FIG. 8 may be changable by inputs of a user through the operation unit 26. For example, the notification in the parking lot is "permitted"; however, when this is changed to "not permitted", the notification in the parking lot may be set to unavailable. Furthermore, for the level of the threshold of a narrow street, the numerical value in the level of the threshold may be changed appropriately to be set at level 1 for 10 to 50 m, level 2 for 50 to 100 m, and level 3 for 100 m or more, for example. Moreover, specific areas and levels thereof may be appropriately added thereto.

In the vehicle approach notification device thus configured, since the notification sound is changed in response to the degree of danger in the specific area, people such as pedestrians can be notified of the approach of the vehicle more reliably in dangerous locations, and also in an area having a low degree of danger, the notification sound is suppressed, and therefore noise disturbance to the neighborhood can be reduced. Also, the notification sound is changed by the changes in the degree of danger corresponding to overlapped specific areas, and time zone, day of the week, and season, and therefore pedestrians and the like can be notified of the approach of the vehicle more appropriately; as a result, a vehicle approach notification device exhibiting improved safety can be obtained.

Third Embodiment

In the vehicle approach notification device 2 and the hybrid vehicle 1 in accordance with the first and second embodiments, notifications are issued on the basis of the list of the thresholds areas of the specific areas; however, in a third embodiment, a vehicle approach notification device that issues notifications corresponding to the travel mode, the travel state, and the state of the headlights in a specific area will be described.

Figure 9:
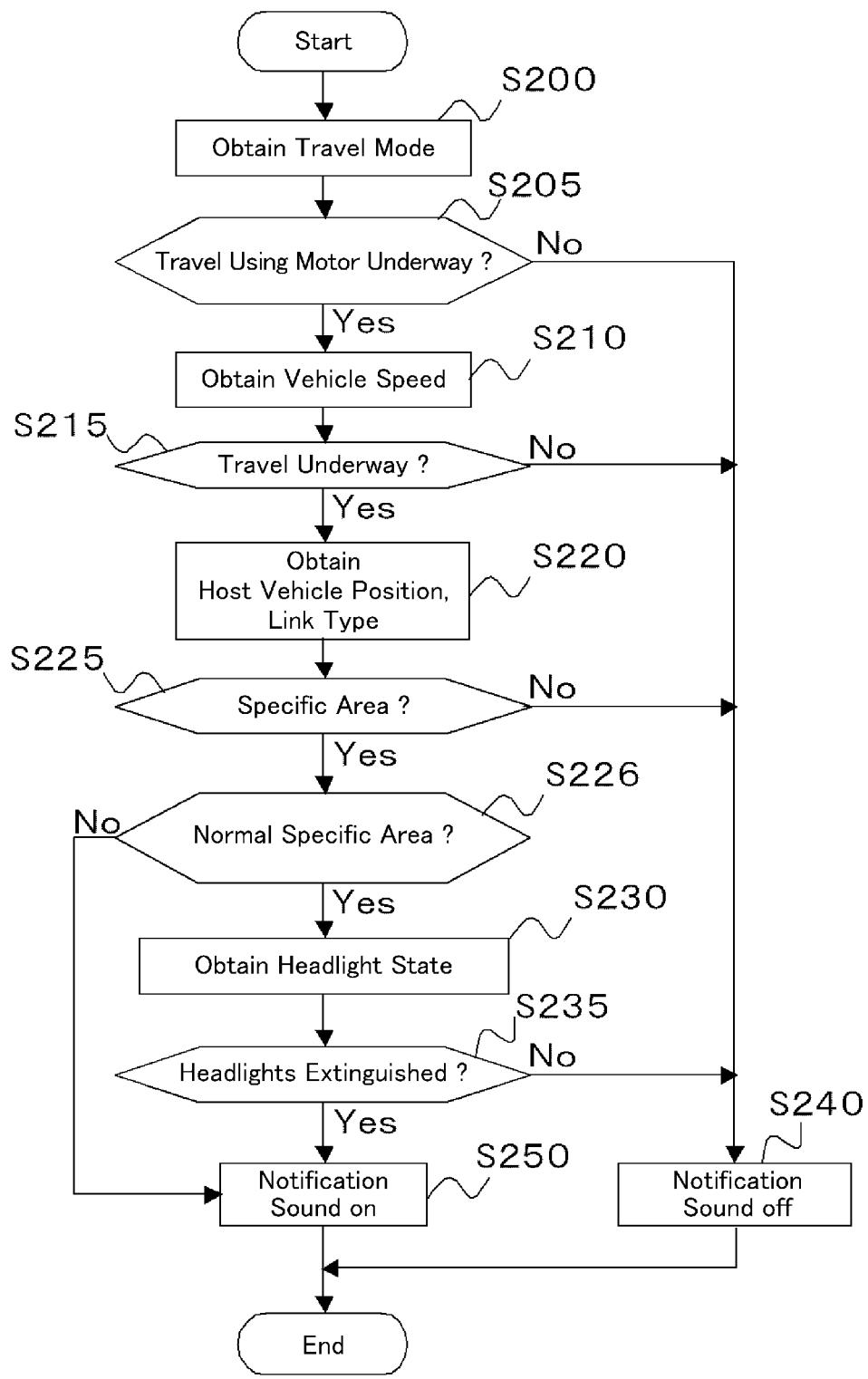
FIG. 9 is a flowchart showing an operation of a vehicle approach notification device in accordance with a third embodiment in the invention.

A block diagram of the vehicle approach notification device 2 and the hybrid vehicle 1 is similar to FIG. 1 of the first embodiment. An operation of this device will be described in accordance with a flowchart in FIG. 9 and a list of ON/OFF of a notification sound in FIG. 10.

First, in Step S200, the notification control unit 28 obtains the travel mode from the drive control unit 16 of the hybrid vehicle 1. When in Step S205 the obtained travel mode indicates a travel using the motor is underway, in other words, the motor travel mode of the motor alone, or the combined mode of the motor and the engine used in combination, the operation proceeds to Step S210. In the engine travel mode of the engine alone, the operation proceeds to Step S240. In this case, the vehicle is the same as a typical vehicle having an internal combustion engine, not emitting the notification sound.

In Step S210, the notification control unit 28 obtains the vehicle speed from the speed detection unit 20. Then, in Step S215, a determination is made as to whether the travel of the vehicle is underway or not. When the travel of the vehicle is underway, the operation proceeds to Step S220. When the vehicle is stopped or stationary, the operation proceeds to Step S240. In this case, since the vehicle is stopped, the notification sound is not emitted.

In Step S220, the notification control unit 28 obtains the link type using the current position of the vehicle from the position detection unit 21 and the map data from the map database 22. Next, the notification control unit 28 determines whether or not the vehicle is on travel in the specific area on the basis of from information obtained from the specific area travel determination unit 23 (Step S225). When the vehicle is on travel in the specific area, the operation proceeds to Step S226. When the vehicle is not on travel in the specific area, the operation proceeds to Step S240. In this case, the vehicle is in a normal area, not emitting the notification sound.

In Step S226, a determination is made as to whether the specific area is a normal specific area or a dangerous specific area. As shown in FIG. 10, the dangerous specific area is an area where the degree of danger is taken to be particularly high, corresponding to a blind curve, a school zone, the surrounding area of an intersection or pedestrian crossing, the surrounding area of an accident black spot, and so on. The other specific areas are defined as normal specific areas. When the specific area is not the normal one, that is, the dangerous one, the operation proceeds to Step S250 to emit the notification sound. When the specific area is the normal specific area, the operation proceeds to Step S230.

In Step S230, the notification control unit 28 obtains the illumination state of the headlights from the light control unit 40. Next, in Step S235, a determination is made as to whether or not the headlights are extinguished. When the lights are extinguished, the operation proceeds to Step S250, where the notification sound is turned ON and the notification of the approach of the vehicle is issued. When the lights are illuminated, the operation proceeds to Step S240. In this case, since pedestrians and the like are notified of the existence of the vehicle by the lights, the notification sound is not emitted. In this manner, noise disturbance to the neighborhood at night can be reduced.

Incidentally, in the above, the instances of the hybrid vehicle are described; however, a vehicle that performs a motor travel by electricity without an internal combustion engine, for example, an electric automobile, a fuel cell vehicle and a solar cell vehicle proceeds to Steps S200, S205, and S210, and similar determinations are made.

In the vehicle approach notification device thus configured, the notification is not issued in the engine travel mode, when the vehicle is stopped, and is in the normal area; however, in the dangerous specific area, the notification is always issued using the notification sound to alert pedestrians and the like, and also in the normal specific area, the notification sound is not emitted when the headlights are illuminated in order to reduce noise at night. In such a way, the notification is issued corresponding to the travel mode and the travel state of the vehicle, and the state of the headlights within the specific area, people such as pedestrians and cyclists can be notified of the approach of the vehicle appropriately.

Fourth Embodiment

The vehicle approach notification devices in accordance with the first to third embodiments include the position detection unit and the map database, and are therefore capable of doubling as a navigation device; however, in a fourth embodiment, a vehicle approach notification device that issues a notification when the state of a vehicle inside the vehicle body changes, for example, upon start thereof, left and right turns thereof, and so on will be described.

A block diagram of the vehicle approach notification device 2 and the hybrid vehicle 1 is similar to FIG. 1 of the first embodiment. An operation of this device will be described in accordance with a flowchart in FIG. 11.

First, in Step S300, the notification control unit 28 obtains a travel mode from the drive control unit 16 of the hybrid vehicle 1. When in Step S310 the obtained travel mode is a travel using the motor, in other words, a motor travel mode of the motor alone or a combined mode of the motor and the engine used in combination, the operation proceeds to Step S320. In the engine travel mode of the engine alone, the operation proceeds to Step S360. In this case, since the vehicle is the same as a typical vehicle having an internal combustion engine, the notification sound is not emitted.

In Step S320, the notification control unit 28 obtains the speed of the vehicle from the speed detection unit 20. Thereafter, in Step S330, a determination is made as to whether or not the vehicle is underway at a predetermined speed or less, for example, on a low-speed travel like 20 km/h or less. When the vehicle is either on the low-speed travel at the predetermined speed or less, or during a stop, the operation proceeds to Step S340. When the speed exceeds the predetermined value, the operation proceeds to Step S360. In this case, since the vehicle is traveling at a high speed, it is assumed that the vehicle is not underway in the specific area where pedestrians need to be notified thereof; therefore, the notification sound is not emitted.

In Step S340, the notification control unit 28 obtains information of the change in the state of the vehicle from the vehicle state change detection unit 50. Thereafter, in Step S350, the notification control unit 28 determines whether the state of the vehicle is changed or not. When the vehicle state is changed, the operation proceeds to Step S370, where the notification sound is turned ON. When the vehicle state is not changed, the operation proceeds to Step S360, and in this case, the notification sound is not emitted.

Concretely, described is a change in the state of the vehicle such that the degree of danger to people such as pedestrians and cyclists is increased, which includes, for example, a case where the vehicle starts to move such as going forward or backward from a stop state thereof. At this time, a notification is issued to alert the pedestrians and so on to a situation that the vehicle is about to move. The notification is also issued during left and right turns thereof. Thus, accidents involving bicycles and the like can be prevented, and a pedestrian walking a pedestrian crossing can be alerted. Note that when the speed of the vehicle is reduced by pressing of the brake, it may be conceived that the driver takes notice of the pedestrian or the like, and therefore it may be selected that the notification sound is not emitted. Thus, the pedestrian is not surprised carelessly by the notification sound, and noise disturbance to the neighborhood can be suppressed.

Further, described is a change in the state of the vehicle in a situation where the degree of danger to people such as pedestrians and cyclists is high, which includes a case starting to turn a light ON and a case turning the light OFF, for example. This is because these occur mainly in a dim light, and therefore it becomes hard for one to recognize the light of the headlights, which makes it difficult to recognize the existence of the vehicle. Also, a case starting to work the wiper may be included therein; this is because it starts to rain at this moment as well, the surface of a road is likely to be slippery, or in a dim light, and therefore, pedestrians and the like need to be alerted.

Incidentally, from the moment the state of the vehicle starts to change, the notification sound may be emitted continuously for several minutes or so, for instance, or may be emitted until the vehicle speed is beyond a predetermined speed like the case of the start thereof. Further, the volume, pitch, and interval of the sound may be changed corresponding to the degree of danger. For example, a backward travel tends to involve a higher degree of danger than a forward travel due to an increase in the number of blind spots of the driver. Further, it is conceived that the degree of danger is increased when a sharp curve rather than a gentle curve is turned right or left due to an increase in the number of the blind spots. Moreover, it is conceived that a field of vision thereof is restricted when the speed of the wiper is high during a heavy rain. In the above events, it is favorable that the volume, pitch, and interval of the sound are changed.

In the vehicle approach notification device thus configured, the notification is issued on a change in the state of the vehicle such that the degree of danger to people such as pedestrians and cyclists is increased, for example, acceleration of the vehicle, right or left turn thereof, in dim light or rain, and so on; therefore, a vehicle approach notification device having a further enhanced safety and issuing an appropriate notification to pedestrians and the like can be obtained. In addition, when the volume, pitch, and interval of the sound are changed corresponding to the degrees of danger, the safety of pedestrians and the like can be further enhanced.

Explanation of Reference Numerals 1 hybrid vehicle
2 vehicle approach notification device
10 engine
11 motor
12 power division mechanism
13 drive wheel
14 power generator
15 battery
16 drive control unit
20 speed detection unit
21 position detection unit
22 map database
23 specific area travel determination unit
24 specific area scale determination unit
25 storage unit
26 operation unit
27 display unit
28 notification control unit
30 notification sound control unit
40 light control unit
50 vehicle state change detection unit

The invention claimed is:

1. A vehicle approach notification device comprising:
   a position detector configured to detect a current position of a vehicle;
   a map database storing map data;
   a CPU programmed to:
      make a determination of a travel thereof in a specific area from a plurality of potential specific areas by using the current position from said position detector and the map data from said map database, and
      when information from said determination indicates the determined specific area, calculate a scale of the determined specific area by using said map data; and
   a storage storing a list of thresholds for said potential specific areas, each threshold indicating a requisite scale for emitting a notification sound of said vehicle within a corresponding one of said potential specific areas,
   wherein the CPU is further programmed to compare information of the calculated scale with the threshold from said storage corresponding to said determined specific area, and when said threshold is satisfied, output a control signal for emitting a notification sound of said vehicle to a notification sound control unit that controls the notification sound.

2. The vehicle approach notification device according to claim 1, wherein said CPU is programmed to output a control signal for changing said notification sound corresponding to a degree of danger in said specific area and a change over time in said degree of danger.

3. The vehicle approach notification device according to claim 1, further comprising an operation unit into which an operation of a user is input,
   wherein said CPU is programmed to correct said list in response to an operation input of the user through said operation unit.

4. A vehicle approach notification device comprising:
   a drive controller configured to control a drive state of a vehicle;
   a speed sensor configured to obtain a speed of said vehicle;
   a light controller configured to control illumination of a light of said vehicle;
   a position detector configured to detect a current position of said vehicle;
   a map database storing map data;
   a CPU programmed to:
      make a determination of a travel in a specific area by using the current position from said position detector and the map data from said map database; and
      output a control signal for emitting a notification sound to a notification sound control unit that controls the notification sound on the basis of drive information from said drive controller, speed information from said speed sensor, illumination information of the light from said light controller, and information of the specific area from said determination,
   wherein under certain conditions corresponding to the drive information, speed information, and information of the determination, the CPU is programmed to output the control signal for emitting the notification sound only if the illumination information of the light from the light controller indicates that the vehicle's headlights are extinguished.

5. The vehicle approach notification device according to claim 4, wherein, in a case where said drive information indicates drive using a motor, said speed information indicates a speed not higher than a predetermined value, and the information of said specific area indicates a specific area other than a dangerous specific area having a high degree of danger, said CPU is programmed to output the control signal for emitting the notification sound when said illumination information of the light indicates the extinguishing thereof.

6. The vehicle approach notification device according to claim 4, wherein in a case where said drive information indicates drive using a motor, said speed information indicates a speed not higher than a predetermined value, and information of said specific area indicates a dangerous specific area having a high degree of danger, said CPU is programmed to output the control signal for emitting the notification sound regardless of illumination information of said light.

* * * * *